(12) United States Patent
Hung

(10) Patent No.: US 9,157,792 B2
(45) Date of Patent: Oct. 13, 2015

(54) PHOTOELECTRIC CONVERSION DEVICE WITH PROTRUSIONS

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 158 days.

(21) Appl. No.: 13/871,091

(22) Filed: Apr. 26, 2013

(65) Prior Publication Data

US 2014/0145064 A1    May 29, 2014

(51) Int. Cl.
*H04B 1/58* (2006.01)
*G01J 1/04* (2006.01)

(52) U.S. Cl.
CPC ............. *G01J 1/0411* (2013.01); *G01J 1/0407* (2013.01)

(58) Field of Classification Search
CPC ................................ H04B 1/587; H04B 10/00
USPC ................................ 250/239, 551; 385/88, 89
See application file for complete search history.

(56) References Cited

U.S. PATENT DOCUMENTS

2012/0189254 A1* 7/2012 Wang et al. ...................... 385/93
2013/0313415 A1* 11/2013 Tseng ............................ 250/216

* cited by examiner

*Primary Examiner* — Renee D Chavez
(74) *Attorney, Agent, or Firm* — Novak Druce Connolly Bove +Quigg LLP

(57) ABSTRACT

A photoelectric conversion device includes a circuit board, a light emitting module, a light receiving module, and an optical coupling lens. The circuit board includes two protrusions apart from each other. The light emitting module and the light receiving module are mounted on the circuit board and are apart from each other. The optical coupling lens includes a light incident surface, a first converging lens, a second converging lens and two through holes are defined therein for locating purposes. The first converging lens and the second converging lens are formed on the light incident surface. Centers of the through holes are aligned with centers of the protrusions to ensure the perfect alignment of the light emitting module with the first converging lens, and the perfect alignment of the light receiving module with the second converging lens.

12 Claims, 4 Drawing Sheets

PHOTOELECTRIC CONVERSION DEVICE WITH PROTRUSIONS

BACKGROUND

1. Technical Field

The present disclosure relates to conversion devices.

2. Description of Related Art

A photoelectric conversion device includes a circuit board, a light emitting module, a light receiving module, and an optical coupling lens. The light emitting module and the light receiving module are mounted on the circuit board. The optical coupling lens includes a first converging lens and a second converging lens. The first converging lens is aligned with and optically coupled with the light emitting module, and the second converging lens is aligned with and optically coupled with the light receiving module. Light emitted from the light emitting module passes through the first converging lens, and light from the second converging lens reaches the light receiving module. The transmission efficiency of light depends on the alignment precision between the first converging lens and the light emitting module and between the second converging lens and the light receiving module. In particular, the higher the alignment precision is, the higher is the transmission efficiency. Therefore, it is important to design a photoelectric conversion device having precise alignment between the first converging lens and the light emitting module and between the second converging lens and the light receiving module.

DETAILED DESCRIPTION

Figure 1:
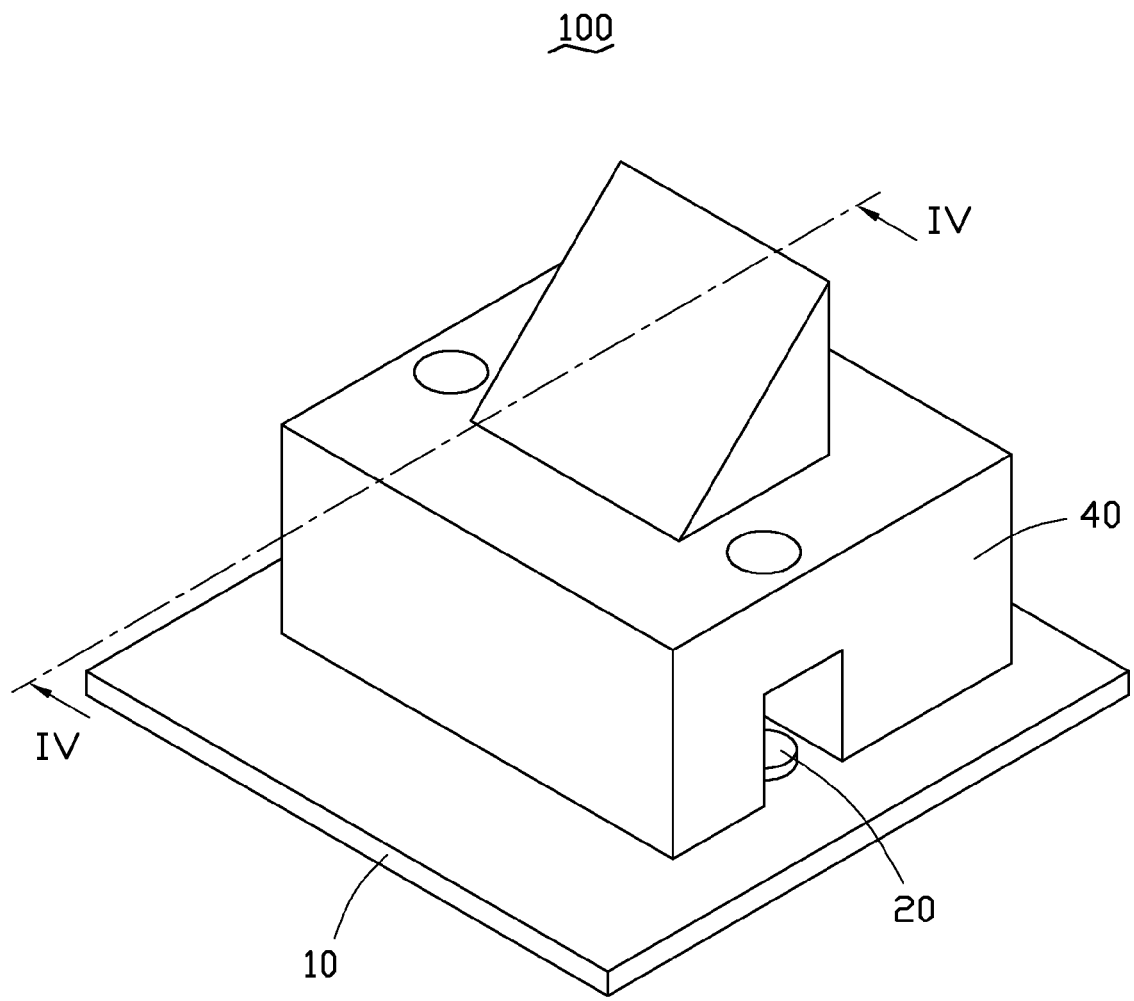
FIG. 1 is a schematic, isometric view of a photoelectric conversion device including an optical coupling lens, according to an exemplary embodiment.
Figure 2:
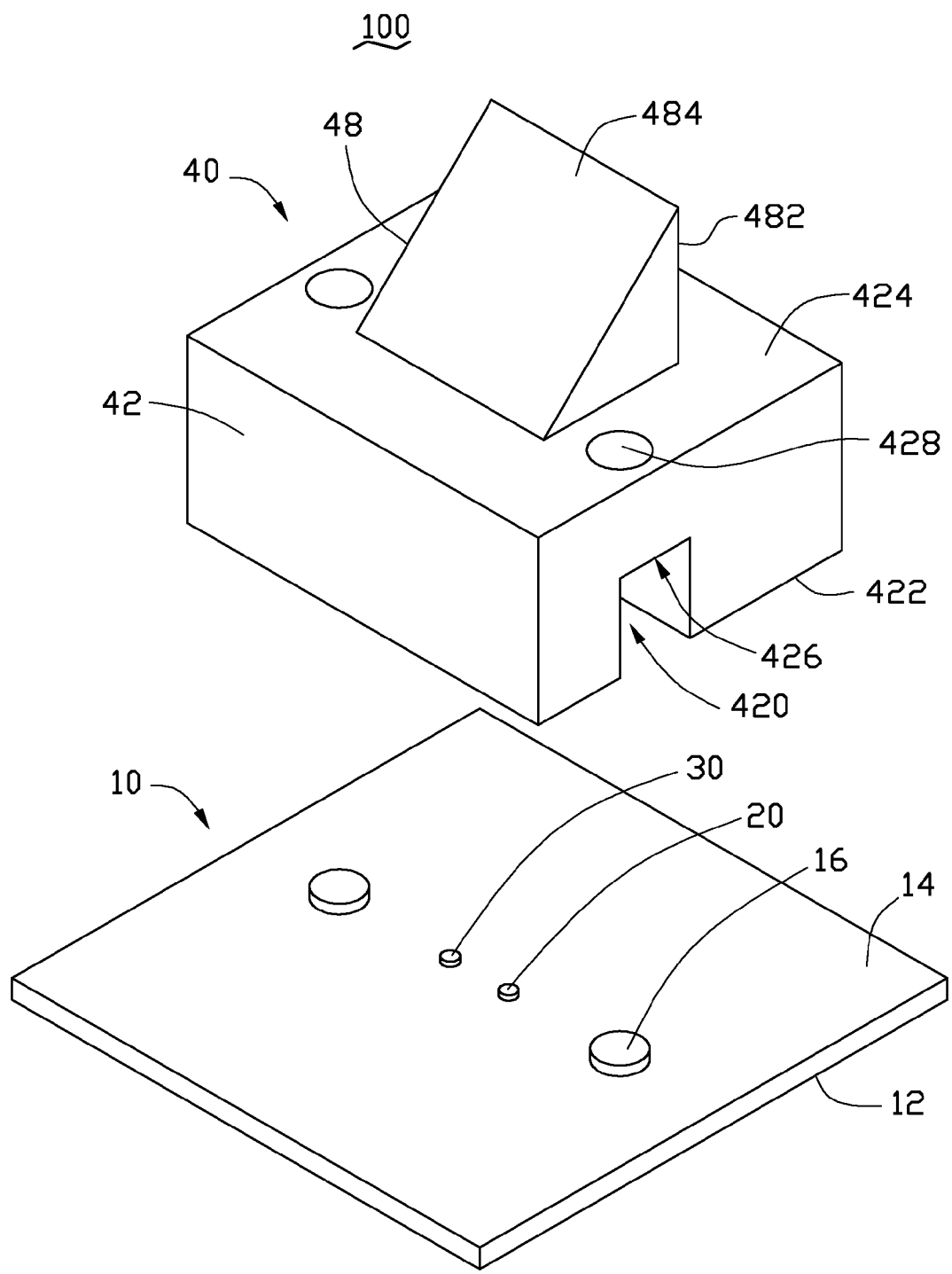
FIG. 2 is an exploded view of the photoelectric conversion device of FIG. 1.

Referring to FIGS. 1 and 2, a photoelectric conversion device 100, according to an exemplary embodiment, includes a circuit board 10, a light emitting module 20, a light receiving module 30, and an optical coupling lens 40.

The circuit board 10 includes a bottom surface 12 and a top surface 14. The bottom surface 12 and the top surface 14 are positioned at opposite sides of the circuit board 10, and the bottom surface 12 is parallel to the top surface 14. Two protrusions 16 perpendicularly extend from the top surface 14. In this embodiment, the protrusions 16 are cylindrical. That is, if the protrusions 16 are cut in a plane parallel to the top surface 14, the cross-section of each of the protrusions 16 is perfectly circular.

The light emitting module 20 and the light receiving module 30 are mounted on the top surface 14 and electrically connected to the circuit board 10. In detail, the light emitting module 20, the light receiving module 30, and the two protrusions 16 are arranged in one line, and the two protrusions 16 are located between the light emitting module 20 and the light receiving module 30. That is, centers of the light emitting module 20, of the light receiving module 30, and of the two protrusions 16 are arranged in one line. In this embodiment, the light emitting module 20 is a vertical cavity surface emitting laser (VCSEL) diode and is configured for emitting light. The light receiving module 30 is a photo diode and is configured for receiving light.

Figure 3:
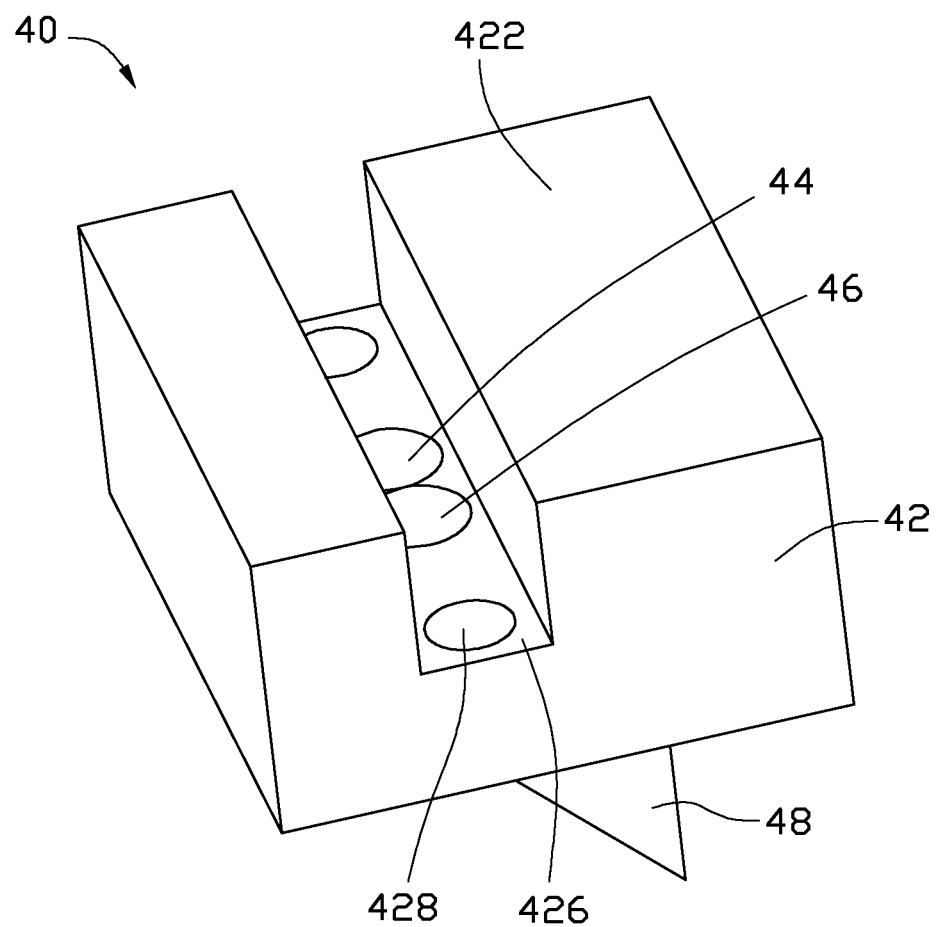
FIG. 3 is a schematic, isometric view of the optical coupling lens of FIG. 1.

Referring to FIGS. 2-3, the optical coupling lens 40 includes a body portion 42, a first converging lens portion 44, a second converging lens portion 46, and a reflection portion 48.

The body portion 42 includes a lower surface 422 and an upper surface 424. The lower surface 422 and the upper surface 424 are positioned at opposite sides of the body portion 42, and the lower surface 422 is parallel to the upper surface 424. The lower surface 422 defines a rectangular recess 420. The recess 420 includes a light incident surface 426 at the bottom. The first converging portion 44 and the second converging lens portion 46 are formed on the light incident surface 426 and arranged apart from each other. The body portion 42 defines two circular through holes 428 passing through the light incident surface 426 and the upper surface 424. The first converging portion 44, the second converging portion 46, and two through holes 428 are arranged in a line, and the first converging portion 44 and the second converging portion 46 are located between the two through holes 428.

The location relationship between the first converging portion 44 and the two through holes 428 is substantially the same as that between the light emitting module 20 and the two protrusions 16, and the location relationship between the second converging portion 46 and the two through holes 428 is substantially the same as that between the light receiving module 30 and the two protrusions 16. In detail, the distance between a center of the first converging portion 44 and a center of each of the through holes 428 is equal to the distance between a center of the light emitting module 20 and a center of a protrusion 16. The distance between a center of the second converging portion 46 and a center of each of the through holes 428 is equal to the distance between a center of the light receiving module 30 and a center of a protrusion 16. The diameter of each of the through holes 428 is equal to the diameter of each of the protrusions 16.

In alternative embodiments, the through holes 428 may be triangular, rectangular, or elliptic and the cross-section of each of the protrusions 16 may accordingly be triangular, rectangular, or elliptic, and the dimensions of each of the through holes 428 is the same as the dimensions of a protrusion 16.

The reflection portion 48 is substantially a triangular prism. The reflection portion 48 perpendicularly extends from the upper surface 424 and is located between the two through holes 428. The reflection portion 48 includes a light output surface 482 and a reflection surface 484. The light output surface 482 is perpendicular to the upper surface 424. The reflection surface 484 is obliquely interconnected between the light output surface 482 and the upper surface 424. An included angle between the reflection surface 484 and the light output surface 482 is about 45 degrees, and an included angle between the reflection surface 484 and the upper surface 424 is about 45 degrees. The reflection surface 484 corresponds to the first converging portion 44 and the second converging portion 46.

When the photoelectric conversion device 100 is assembled, the optical coupling lens 40 is adhered on the top surface 14 with adhesive. In detail, first, the optical coupling lens 40 is placed on the top surface 14. Second, the optical coupling lens 40 is moved until the centers of the protrusions 16 are aligned with the centers of the through holes 428, while the location of the protrusions 16 can be observed through the through holes 428. In this situation, the protrusions 16 completely coincide with the through holes 428 and are received in the recess 420, the light emitting module 20 is thus completely aligned with the first converging portion 44, and the light receiving module 30 is thus completely aligned with the second converging portion 46. Third, glue is applied to sidewalls of the optical coupling lens 40 to fix the optical coupling lens 40 on the top surface 14. Thereby, the photoelectric conversion device 100 has a high alignment precision and a high transmission efficiency of light.

Figure 4:
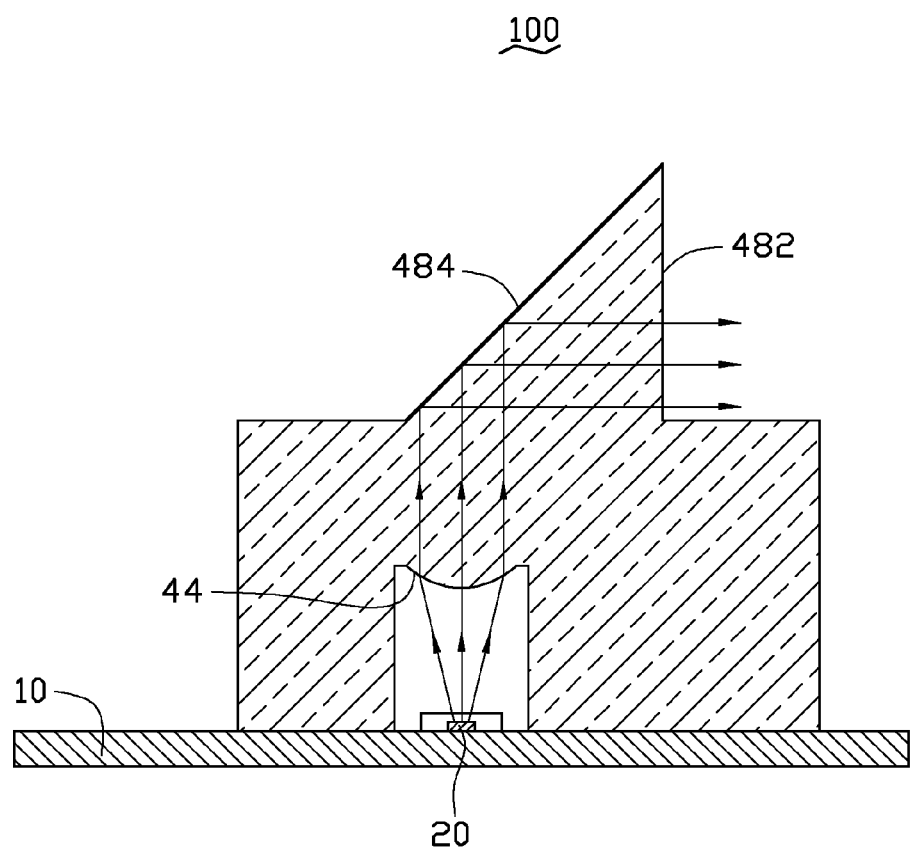
FIG. 4 is a sectional view of the photoelectric conversion device of FIG. 1, taken along the line IV-IV of FIG. 1.

Referring to FIG. 4, when in use, electrical power is applied to the light emitting module 20 and the light receiving module 30 through the circuit board 10, thus light beams emitted from the light emitting module 20 enter into the first converging portion 44 and become parallel, and are then reflected about 90 degrees toward the light output surface 482 by the reflection surface 484, and finally exit from the light output surface 482. Accordingly, parallel light beams passing through the light output surface 482 are reflected about 90 degrees toward the second converging portion 46, and are finally converged into the light receiving module 30 by the second converging portion 46.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A photoelectric conversion device comprising:
a circuit board comprising two protrusions apart from each other;
a light emitting module mounted on the circuit board;
a light receiving module mounted on the circuit board and being apart from the light emitting module; and
an optical coupling lens mounted on the circuit board comprising a light incident surface, a first converging portion, a second converging portion, the optical coupling lens defining two through holes, the first converging portion and the second converging portion formed on the light incident surface, the location relationship between the first converging portion and the two through holes being substantially the same as that between the light emitting module and the two protrusions, the location relationship between the second converging portion and the two through holes being substantially the same as that between the light receiving module and the two protrusions, centers of the through holes aligned with centers of the protrusions to ensure alignment of the light emitting module with the first converging portion, and alignment of the light receiving module with the second converging portion, and the through holes being spaced apart from the protrusions.

2. The photoelectric conversion device as claimed in claim 1, wherein the optical coupling lens comprises a body portion and a reflection portion, the body portion comprises a lower surface and an upper surface, the lower surface defines a recess, the light incident surface is located at the bottom of the recess, the reflection portion perpendicularly extends from the upper surface and comprises a reflection surface and a light output surface, the light output surface is perpendicular to the upper surface, and the reflection surface is obliquely interconnected between the light output surface and the upper surface.

3. The photoelectric conversion device as claimed in claim 2, wherein an included angle between the reflection surface and the light output surface is about 45 degrees, and an included angle between the reflection surface and the upper surface is about 45 degrees.

4. The photoelectric conversion device as claimed in claim 2, wherein the circuit board comprise a bottom surface and a top surface opposite to the bottom surface, the light emitting module and the light receiving module are mounted on the top surface, the through holes pass through the upper surface and the light incident surface, the optical coupling lens is mounted on the top surface, the lower surface contacts the top surface, the protrusions are mounted on the top surface and received in the recess.

5. The photoelectric conversion device as claimed in claim 4, wherein the optical coupling lens is adhered to the top surface with adhesive.

6. The photoelectric conversion device as claimed in claim 1, wherein the shape of each of the through holes is the same as the shape of a cross-section of each of the protrusions.

7. The photoelectric conversion device as claimed in claim 6, wherein the dimension of each of the through holes is the same as the dimension of the cross-section of each of the protrusions.

8. The photoelectric conversion device as claimed in claim 7, wherein each of the through holes is circular, and each of the protrusions is cylinder.

9. The photoelectric conversion device as claimed in claim 7, wherein each of the through holes is triangular, rectangular, or elliptic.

10. The photoelectric conversion device as claimed in claim 1, wherein the light emitting module and the light receiving module are electrically connected to the circuit board.

11. The photoelectric conversion device as claimed in claim 1, wherein the light emitting module, the light receiving module, and the two protrusions are arranged in one line, and the two protrusions are located between the light emitting module and the light receiving module.

12. The photoelectric conversion device as claimed in claim 1, wherein the first converging portion, the second converging portion, and the through holes are arranged in a line, and the first converging portion and the second converging portion are located between the two through holes.

* * * * *